United States Patent [19]

Duarte, Jr. et al.

[11] Patent Number: 5,284,393
[45] Date of Patent: Feb. 8, 1994

[54] SLIDING BEARING

[75] Inventors: Durval Duarte, Jr.; Manfred Kaufmann, Jr.; Mario Sergio Praça; Walter Zottin, all of São Paulo, Brazil

[73] Assignee: Metal Leve S.A. Industria E Comercio, San Paulo, Brazil

[21] Appl. No.: 840,919

[22] Filed: Feb. 21, 1992

[30] Foreign Application Priority Data

Feb. 25, 1991 [BR] Brazil ................... 9100852

[51] Int. Cl.⁵ ............................................. F16C 33/10
[52] U.S. Cl. ................................. 384/291; 384/288
[58] Field of Search ............... 384/111, 291, 283, 286, 384/287, 288, 450

[56] References Cited

U.S. PATENT DOCUMENTS

| | | | |
|---|---|---|---|
| 3,625,580 | 12/1971 | DeHart | 384/288 |
| 4,307,921 | 12/1981 | Roberts | 384/288 X |
| 4,311,349 | 1/1982 | Roberts | 384/288 |
| 4,400,099 | 8/1983 | Ehrentraut | 384/288 |
| 5,000,584 | 3/1991 | Simmons | 384/291 X |
| 5,009,522 | 4/1991 | Hahn | 384/291 X |
| 5,072,654 | 12/1991 | MacGregor | 384/286 X |

*Primary Examiner*—Thomas R. Hannon
*Attorney, Agent, or Firm*—Darby & Darby

[57] ABSTRACT

A sliding bearing (10) having an inner surface (13a) provided with at least one circumferential recess (15, 16) extending over a portion of the axial dimensions of the inner surface (13).

The recess (15, 16) is located over one portion of the inner surface (13a) which is subjected to a peak oil film pressure (POFP) higher than a minimum value previously calculated for, and/or located up to 45 degrees upstream considering the rotation direction of the shaft, in one region of the inner surface (13a) where the minimum oil film thickness (MOFT) is less than a value previously calculated. Each circumferential recess (15, 16) is defined by a maximum radial depth E, a circumferential range given by the angle α, which vary according to construction and operational features of the bearing (10), in order to cause the values of pressure and/or oil film thickness to meet values previously calculated for the bearing (10).

11 Claims, 2 Drawing Sheets

SLIDING BEARING

FIELD OF THE INVENTION

The present invention discloses an improvement in the field of internal combustion engines. More particularly, the invention deals with a development provided on sliding bearings for such engines.

PRIOR ART

Among the most important characteristics of advanced internal combustion engines are a high degree of capacity and conditions to withstand extremely severe running conditions.

Sliding bearings are designed to operate under hydrodynamic conditions, i.e., a minimum thickness of an oil film has to be present between the rotating shaft and the respective contact surface of the shaft with the bearing, in order to provide free orbit and smooth running for the shaft, with no contact between such parts.

Under the aforementioned conditions, especially due to high mechanical loads imposed on the bearing, which in turn are a result of high combustion pressure in the combustion chamber and inertial forces due to the high speed of the engine as well, it is not always possible to maintain said minimum oil film thickness therebetween. If the film is sheared it possibly can cause the bearing to fail prematurely due to the excessive wear on its sliding layer which, in extreme cases, may even damage the shaft.

Because of these deficiencies, it is common to provide sliding bearing layers with at least one soft phase, by the addition of elements such as Pb, Sn, Cd, Bi and others, to act in situations of emergency running, e.g., when the peak oil film pressure (POFP) is higher than the limits specified for it or even when the minimum oil film thickness (MOFT) is lower than its limits or both. However, the addition of said elements is not sufficient to improve the contact between the shaft and the sliding layer and, additionally, to embed impurities in the lubricating oil.

Another solution for the problem is the provision of a higher load bearing capacity by filling grooves provided in the circumferential direction of the bearing sliding layer with softer material. Such feature would cause the bearing to withstand higher loads and embed impurities in a more satisfactory way. Various arrangements to attain such construction have been practiced, such as the disclosures in U.S. Pat. No. 4,400,099 to Ehrentraut and in Brazilian pending appln. PI 8602877. Although technically acceptable, this solution adds costs and acts against the trends of reducing the manufacturing costs of engines.

Another solution widely employed to solve this problem relates to an increase in the inner bearing surface radius on the regions where the probability of an oil film shearing is greater, and, accordingly, where the surface wear can be greater, i.e., near the parting line of the upper and lower half bearing. This provides an oil pocket in said region, thus imparting a safety margin to the assembly. U.S. Pat. Nos. 3,625,580 and 4,311,349 disclose such an approach. Despite being more acceptable than the aforementioned proposals, with this approach the remaining portions of the inner bearing surface located on the central portion of the bearing more distant from the oil pockets, remains unprotected.

BRIEF DESCRIPTION OF THE INVENTION

It is, therefore, the main object of the present invention to provide a solution to reduce the potential wear of sliding bearings intended for severe automotive purposes, through an economically acceptable feature which allows every portion of the bearing sliding layer to be protected.

The main object above cited is attained by the provision of a sliding bearing having a backing layer and at least one sliding layer provided with an inner surface to support a rotating shaft with a lubricating oil film therebetween.

According to the invention, the bearing inner surface is provided with at least one circumferential recess on at least one portion of the axial direction (length) of said inner surface, where with the engine running, the oil film pressure (POFP) is higher than a maximum value calculated for it and/or located up to 45 degrees upstream considering the shaft rotation direction, of one region where the minimum oil film thickness (MOFT) is lower than a minimum value calculated for it.

Each circumferential recess is defined by a minimum and maximum circumferential width, a maximum radial depth E, a circumferential range "alpha" ($\alpha$), all varying according to specific characteristics of design requirements and obtained by means of mathematical simulation in order to keep the values of oil pressure and/or oil film thickness in the limits specified for the bearing.

Location of each recess follows an axial distribution and a generally axial alignment, thereby defining for each purpose either an oil pressure reducing recess or a recess to increase thickness, respectively, in the regions where the oil pressure is too high or its thickness is deficient. It was found that the provision of such recesses reduces the damages that may be caused to the bearing and the shaft as well, as hereinafter explained in greater detail.

BRIEF DESCRIPTION OF THE DRAWINGS

The invention will be now described with reference to the appended drawings in which.

DETAILED DESCRIPTION OF THE INVENTION

Figure 1:
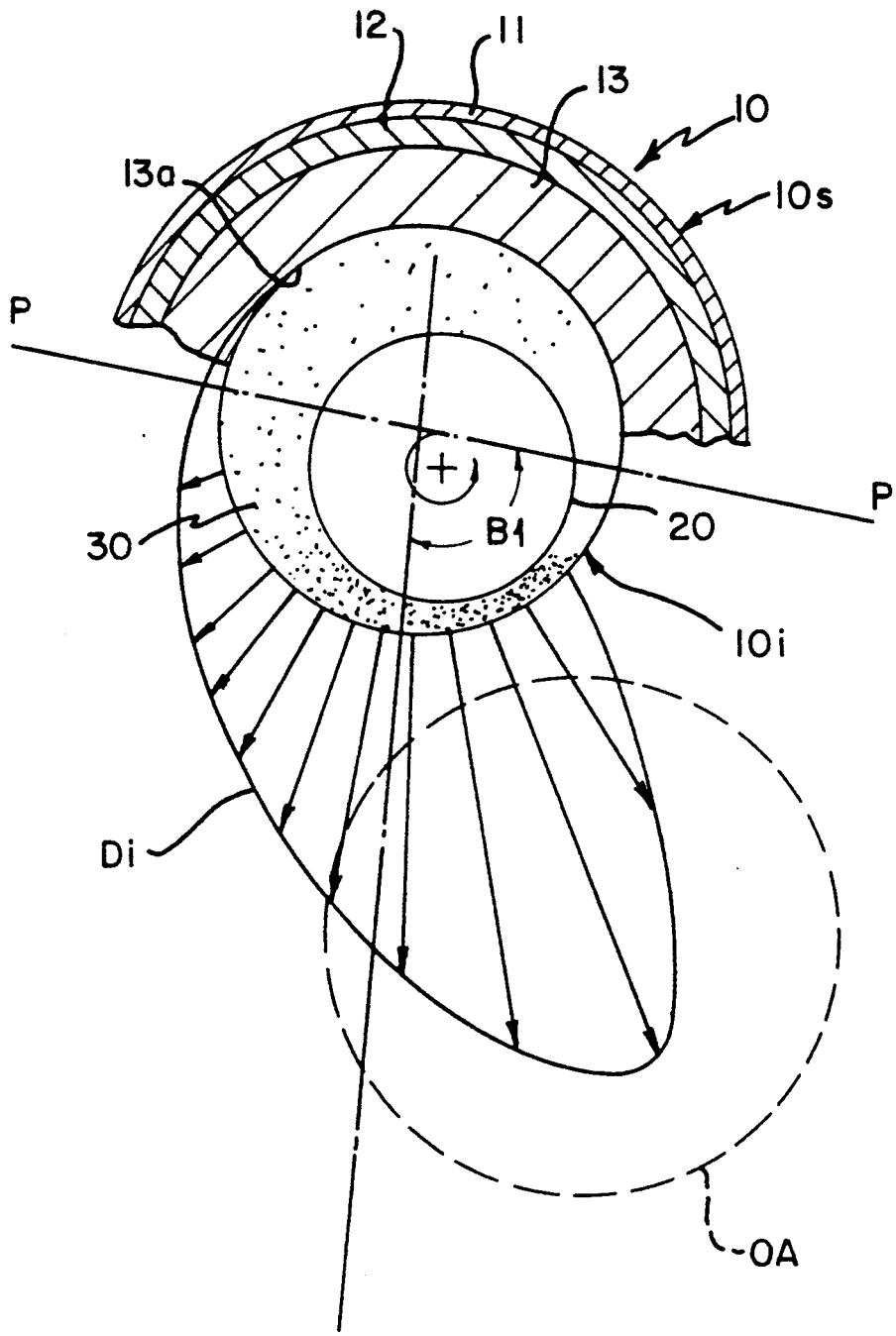
FIG. 1 is a schematic section view of an assembly composed of two bearing halves and a shaft according to the prior art, illustrating the distribution of the oil film pressure.

In a sliding bearing 10, there is a parting line P—P which divides an upper portion 10s from a lower portion 10i, each of them comprising one outer or backing layer 11, generally made of steel, one optional intermediate layer 12 made of an aluminum alloy, lead alloy or another suitable material, and an inner sliding layer 13 which can be made of a Cu-Sn-Pb alloy. In this embodiment the parting line P—P is inclined by some degrees in relation to a horizontal plane.

The bearing 10 is designed to bear a rotating shaft 20 with an oil film 30 therebetween, to ensure perfect hydrodynamic conditions when running. However, due to a possible overload applied by the shaft 20 on the surface 13a, the minimum oil film thickness (MOFT) and/or the peak oil film pressure (POFP) may not meet the design specifications, thereby causing a loss of or a serious deficiency to the bearing lubrication due to a lack of oil or an excessive pressure which overloads some regions of the bearing inner surface 13a.

When the oil pressure increases excessively, the oil pressure distribution takes on the shape of the graph shown in FIG. 1 and indicated by the arrows in the area Di. Said overloading due to the excessive oil pressure causes the bearing to fail prematurely by deformation of the surface 13a as a consequence of the excessive wear, which may ultimately damage the shaft.

To overcome the problem of a detrimental oil film pressure distribution as shown in FIG. 1, the inner surface 13a of the bearing 10 is provided by machining or any suitable method, with one circumferential recess or groove on at least one region of its axial portion.

In the example of FIG. 1, the pressure distribution of the oil film presents only one pronounced deformation indicated by the line OA.

To eliminate said deformation, the circumferential recess is provided according to an axial alignment in the region of the inner surface 13a where the deformation takes place. It should be mentioned that the determination of regions where the inner bearing surface 13a is more subject to premature wear by an excessive oil film pressure is obtained by mathematical simulations.

Figure 2:
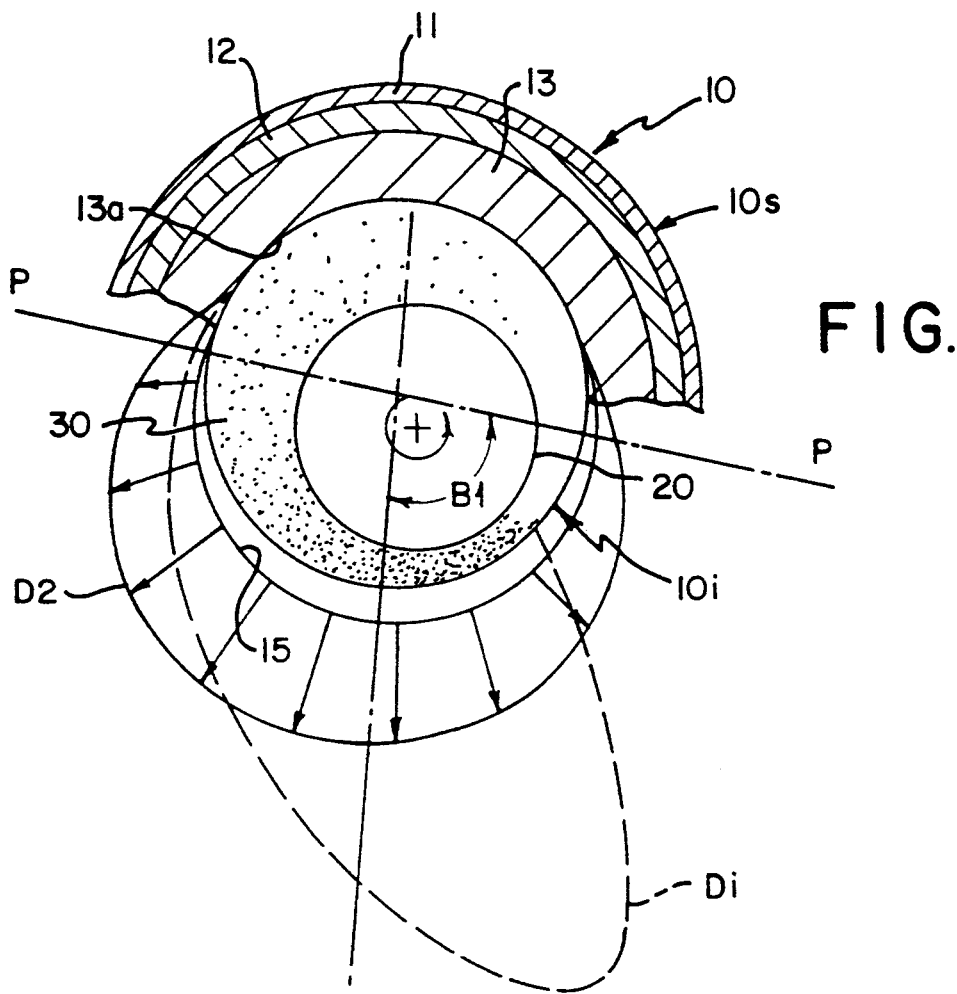
FIG. 2 depicts the assembly of FIG. 1 provided with one oil pressure reducer recess, according to one aspect of the invention, and illustrates the oil film pressure profile according to the invention.

In the example of FIG. 1, it was found that the region subjected to a premature wear due to an uneven oil film pressure distribution is located at the lower portion 10i of the bearing 10, more specifically at the region comprised by the plane which forms an angle B1 with the parting plane P—P of bearing 10. As shown in FIG. 2, the provision of the recess 15 along the inner surface 13a of the bearing 10 at the point coincidental with the unevenness of the oil film distribution eliminates said deformation as illustrated in the pressure distribution area D2.

Figure 3:
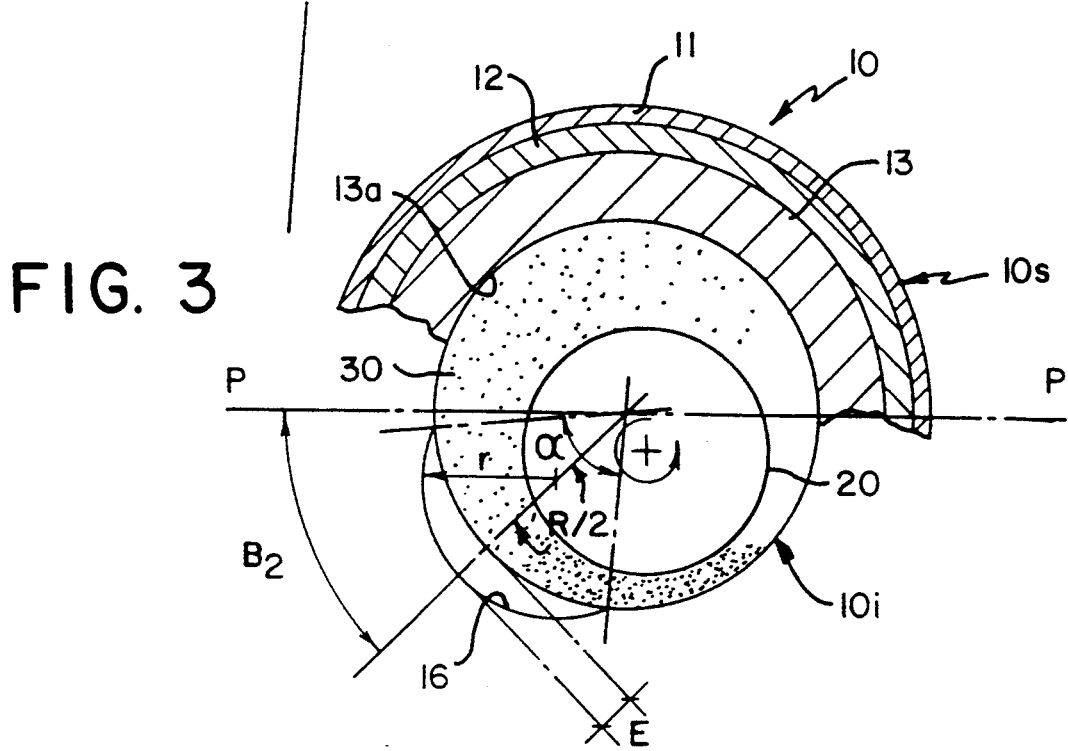
FIG. 3 is a cross sectional view of the assembly of FIG. 1, showing a recess to restore the oil film thickness arranged according to a substantially axial alignment, according to a second aspect of the present invention.

Now referring to FIG. 3, there is shown the provision of an oil thickness increasing recess 16 in another angular position, along the inner surface 13a of the bearing 10, said recess 16 being positioned in a region situated up to 45 degrees upstream, considering the direction of rotation of the shaft, from the region determined by mathematical simulation as being potentially critical concerning a deficiency of oil film thickness. Location of said recess 16 is further adjusted by successive mathematical interactions so as to obtain more accurate results.

Dimensions of the oil thickness recovery recess 16 considers three variables:

E, or recess maximum depth, measured from the inner surface 13a of the bearing 10, α, or angle in radian degrees of the circumferential range in which said recess 16 extends;

a third variable (not shown) referring to the axial extent dimension of the recess and varies according to each specific design, and it may extend along all or part of the inner surface 13a.

$$r = \frac{R}{2} + E; \quad \text{a)}$$

$$E = K(1.0 - e^{-s}); \quad \text{b)}$$

$$S = \frac{h_{min} - h_{calc}}{h_{calc}} \quad \text{c)}$$

$$h_{max} = h_{calc} + E, \quad \text{d)}$$

where:

r is the geometric radius whose dimension is equivalent to half the inner radius R of bearing 10 plus the depth maximum E of recess 16;

K is a regulating factor for depth E, varying at an inverse ratio with the hardness of the sliding bearing 13a material, i.e., the higher the bearing material hardness, the lower the value of K, said value always higher than or equal to 5, preferably between 5 and 10 ($5 \leq K \leq 10$);

E is the maximum depth of the recess 16 measured from the inner surface 13a of the bearing 10.

e is the base for the Naperian logarithm;

S is the relative difference between the theoretical value of the minimum oil film thickness MOFT ($h_{min}$) for the oil film 30 and the value obtained by mathematical simulations which is considered as the actual value of oil film 30 ($h_{calc}$) at one given moment of rotation of the shaft 20;

$h_{max}$ is the maximum oil film thickness considering the recess 16.

Once known that in the position $B_2 + 45$ degrees the thickness $h_{calc}$ of the oil film 30 is lower than $h_{min}$ (for instance, $h_{min} = 2.0$ μm and $h_{calc} = 0.5$ μm) it is possible to establish by equation c) above that the relative difference S between the cited values is:

$$S = \frac{2.0 - 0.5}{0.5} = 3.0 \quad \text{e)}$$

There is then defined the value of depth E of recess 16 to be machined on the soft surface of the bearing; thus the value of K is stated as K=5, in an alignment coincidental the plane defining angle $B_2$ with the parting line P—P:

$E = K[1.0 - e^{-5}]$;

$E = 5[1.0 - e^{-3}]$;

$E = 5[1.0 - 0.049]$;

$E = 4.75$ mm $r = R/2 + E$

Thus, in the particular case of the oil film thickness recovery recess 16, dimensioning of its maximum depth E and its radial extension (range) α may be obtained as a function of minimum theoretical values of $h_{min}$ for the bearing and of $h_{calc}$ obtained by mathematical simulations.

In the preferred embodiment shown in FIGS. 2 and 3, the recesses 15 and 16 exhibit a longitudinal section of a circumferential shape. However, it should be appreciated that in some cases of oil pressure reduction or increase in oil film thickness, it may be possible or even advisable to set longitudinal sections for the recesses other than circumferential, such as triangular, square, polygonal, either regular or irregular, always with due consideration to the limits of maximum depth E and the angular range α required for each case.

We claim:

1. Sliding oil lubricated circular bearing for internal combustion engines, comprising:
   a backing layer and at least one sliding layer having an inner surface for bearing a rotating shaft between which there is an oil film, between the sliding layer and the rotating shaft,
   at least one recess formed on said inner surface extending along a portion of the axial direction of the shaft at a region of said inner surface of the bearing which is subjected to an oil film pressure higher than a first predetermined maximum value and/or placed up to 45 degrees upstream in the rotation direction of the shaft in one region of said inner surface where the minimum oil film thickness is lower than a second predetermined value,
   each recess having a maximum radial depth E and a circumferential range α, which vary according to construction and operational characteristics of the bearing which dimensions E and α are defined to maintain the oil pressure and the oil film thickness values within respective first and second predetermined values.

2. Sliding bearing according to claim 1, wherein the radial depth E and the circumferential range α of a recess is based upon the relative difference between the minimum oil film thickness ($h_{min}$) and the thickness ($h_{calc}$) required for such bearing at a given critical region of the surface.

3. Sliding bearing according to claim 2, wherein the maximum radial depth E of a recess is given by the expressions:

$$S = \frac{h_{min} - h_{calc}}{h_{calc}}$$

-continued
$$E = K \times (1.0 - e^{-s})$$

where e is the base for the Naperian logarithm.

4. Sliding bearing, according to claim 3, wherein the circumferential extension α of a recess is limited by the following equation:

$$r = R/2 + E$$

where r is the distance between each end of the recess on the inner surface and the medium point of the inner radius R of the bearing, whose prolongation divides the recess in two equal portions.

5. Sliding bearing, according to claim 4, wherein a recess has a maximum depth E in the middle point of its circumferential extension, decreasing towards the opposite ends of the recess.

6. Sliding bearing according to claim 5, wherein the bottom of a recess is round shaped and has the middle point of the minimum thickness and the opposite ends on the surface.

7. Sliding bearing according to claim 6, wherein the bend radius of the recess bottom comprises the distance r between the opposite ends of the recess and the middle point of inner radius R, whose prolongation divides the recess in two equal portions.

8. Sliding bearing according to claim 1, wherein a recess has a round shaped longitudinal section.

9. Sliding bearing according to claim 1, wherein said sliding bearing includes an intermediate layer composed mainly of aluminum or lead or another suitable antifriction material between the backing layer and the sliding layer.

10. Sliding bearing according to claim 1, wherein the sliding layer is a bronze alloy.

11. Sliding bearing according to claim 1 wherein said recess extends in a circumferential direction on the inner surface.

* * * * *